(12) United States Patent
Sochava et al.

(10) Patent No.: US 7,061,946 B2
(45) Date of Patent: Jun. 13, 2006

(54) INTRA-CAVITY ETALON WITH ASYMMETRIC POWER TRANSFER FUNCTION

(75) Inventors: Sergei L. Sochava, Sunnyvale, CA (US); William B. Chapman, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 296 days.

(21) Appl. No.: 10/294,051

(22) Filed: Nov. 13, 2002

(65) Prior Publication Data

US 2004/0091001 A1    May 13, 2004

(51) Int. Cl.
*H01S 3/10* (2006.01)

(52) U.S. Cl. ............ 372/20; 372/98; 359/577; 359/578; 359/589

(58) Field of Classification Search ............ 372/20, 372/98; 359/577, 578, 589, 260
See application file for complete search history.

(56) References Cited

U.S. PATENT DOCUMENTS

| | | | | |
|---|---|---|---|---|
| 4,525,067 A | * | 6/1985 | Hernandez | ............ 356/454 |
| 4,647,203 A | * | 3/1987 | Jones et al. | ............ 356/480 |
| 5,666,225 A | * | 9/1997 | Colbourne | ............ 359/589 |
| 5,926,317 A | * | 7/1999 | Cushing | ............ 359/588 |
| 6,205,159 B1 | | 3/2001 | Sesko et al. | |
| 6,282,215 B1 | | 8/2001 | Zorabedian et al. | |
| 6,507,593 B1 | * | 1/2003 | Spinelli et al. | ............ 372/20 |
| 6,519,065 B1 | * | 2/2003 | Colbourne et al. | ............ 398/81 |
| 6,631,033 B1 | * | 10/2003 | Lewis | ............ 359/584 |
| 6,654,564 B1 | * | 11/2003 | Colbourne et al. | ............ 398/147 |
| 6,683,721 B1 | * | 1/2004 | Copner et al. | ............ 359/618 |
| 6,768,874 B1 | * | 7/2004 | Colbourne et al. | ............ 398/147 |
| 2002/0196549 A1 | * | 12/2002 | Randall et al. | ............ 359/578 |
| 2003/0016707 A1 | * | 1/2003 | McDonald et al. | ............ 372/20 |

FOREIGN PATENT DOCUMENTS

WO    WO 00/45201 A1 *  8/2000

OTHER PUBLICATIONS

N. A. Olsson and J. P. Van Derziel, "Performance Characteristics of 1.5-μm External Cavity Semiconductor Lasers for Coherent Optical Communication", IEEE 1987, Journal of Lightwave Technology, vol. LT-5, No. 4, Apr. 1987.

Paul Zorabedian, "Axial-Mode Instability in Tunable External-Cavity Semiconductor Lasers", IEEE 1994, IEEE Journal of Quantum Electronics, vol. 30, No. 7, Jul. 1994.

* cited by examiner

*Primary Examiner*—James Menefee
(74) *Attorney, Agent, or Firm*—Blakely, Sokoloff, Taylor & Zafman LLP (57) ABSTRACT

Apparatus and methods for compensation of asymmetric mode pulling in external cavity lasers and the like. An apparatus includes a wavelength locker or etalon device to provide an asymmetric power transfer function and generate a transmission peak or peaks of asymmetric shape. The asymmetry of the transmission peak may be in the form of a steeper slope on the long wavelength side of the peak than on the short wavelength side. The asymmetry of the transmission peak or peaks may be structured to compensate or correct for asymmetric mode pulling effects that arise in laser gain media during single mode laser operation.

53 Claims, 7 Drawing Sheets

INTRA-CAVITY ETALON WITH ASYMMETRIC POWER TRANSFER FUNCTION

FIELD OF THE INVENTION

The present invention relates to optical communications systems and, more particularly, to lasers used in optical communication systems. Still more particularly, the present invention is related to etalon devices used in implementing such lasers.

BACKGROUND INFORMATION

The demand for increased bandwidth in fiber optic telecommunications has driven the development of sophisticated transmitter lasers usable for dense wavelength division multiplexing (DWDM) systems wherein multiple separate data streams propagate concurrently in a single optical fiber. Each data stream is created by the modulated output of a semiconductor laser at a specific channel frequency or wavelength, and the multiple modulated outputs are combined onto the single fiber. The International Telecommunications Union (ITU) presently requires channel separations of 50 GHz, or approximately 0.4 nanometers, which allows up to 128 channels to be carried by a single fiber within the bandwidth range of currently available fiber amplifiers. Greater bandwidth requirements will likely result in smaller channel separation in the future.

DWDM systems have largely been based on distributed feedback (DFB) lasers where spatial variations of the waveguide structure allow for a single wavelength operation Due to lack of control over the wavelength individual DFB transmitters are usable only for a single channel or a small number of adjacent channels.

Tunable external cavity lasers with internal frequency lockers or etalons have been developed to overcome the limitations of individual DFB devices. One drawback common to many external cavity lasers with intra-cavity etalons is an asymmetric mode pulling effect during laser operation that hinders stable, single mode lasing and complicates servo functions associated with laser operation. There is accordingly a need for external cavity laser and tuning mechanism that provides stable, single mode lasing. The present invention satisfies this need, as well as others, and overcomes the deficiencies found in the background art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Aspects of various embodiments of the present invention provide apparatus and methods for compensation of asymmetric mode pulling in external cavity lasers. In one aspect, a wavelength locker or etalon device is configured to provide an asymmetric power transfer function and generate a transmission peak or peaks of asymmetric shape. The asymmetry of the transmission peak may be in the form of a steeper slope on the long wavelength side of the peak than on the short wavelength side. The asymmetry of the transmission peak or peaks may be structured and configured to compensate or correct for asymmetric mode pulling effects that arise in external cavity lasers during single mode laser operation.

Another aspect of the present invention may have at least two pairs of mutually parallel reflective surfaces configured to define the asymmetric power transfer function. For example, the two pairs of reflective surfaces can be implemented with two etalons. In certain embodiments, the first and second etalons are joined together at a central one of the reflective surfaces, with the outer reflective surfaces defining a third etalon. The first etalon defines a first set of transmission peaks corresponding to selectable wavelengths, and the second and third etalons respectively define second and third sets of transmission peaks configured to introduce asymmetry to the first set of transmission peaks. The first, second and third sets of transmission peaks define a set of asymmetric transmission peaks each having first and second slopes and a transmission maximum therebetween, the first slope being steeper than the second slope. In some embodiments, the first slope is on a longer wavelength side of the transmission maximum, such that the set of asymmetric transmission peaks is configured to compensate an asymmetric mode pulling effect caused by a laser gain medium. The set of asymmetric transmission peaks may include a single transmission peak or a plurality of transmission peaks.

By way of example, and not of limitation, the first and second etalons each may respectively have first and second free spectral ranges (FSRs), the second FSR within approximately two percent of the first FSR, while the third etalon has a third FSR that is smaller than the first FSR and the second FSR. In certain embodiments, the third FSR is approximately one half that of the first FSR. One or more of the etalons may be tunable.

Another aspect provides a laser apparatus that includes a gain medium emitting a light beam, a reflective element positioned in the light beam, and an etalon element positioned in the light beam between the gain medium and the reflective element. The etalon element may be configured to generate an asymmetric power transfer function and implemented as described above. The apparatus may further include a wavelength selection element positioned in the light beam between the gain medium and the end mirror. The wavelength selection element may be tunable, and may also be configured to generate an asymmetric power transfer function. The etalon element may additionally, or alternatively, be tunable.

Another aspect provides methods of laser operation that include emitting a light beam by a gain medium, and generating an asymmetric power transfer function in association with the light beam. The methods may additionally include positioning a reflective element in the light beam. The methods may further include compensating an asymmetric mode pulling effect in the gain medium using the asymmetric power transfer function. The asymmetric power transfer function may be generated by generating a plurality of asymmetric transmission peaks, with each asymmetric transmission peak corresponding to a selectable wavelength. The methods may still further include selecting a wavelength corresponding to one of the asymmetric transmission peaks, and feeding backlight to the gain medium at the selected wavelength. In this regard, the methods may include positioning a wavelength selection element in the light beam between the gain medium and the reflective element, such that tuning the wavelength selection element may carry out the selecting.

In application, embodiments of the present invention may be used as a wavelength locker in an external cavity laser. In certain embodiments, the wavelength locker can have two or more etalons, one of which that defines a selected wavelength spacing or channel grid. Other etalons serve as secondary etalons that operate to introduce a desired asymmetric shape and/or shift to the transmission peaks of the primary etalon, thus providing a series of asymmetric transmission bands that can compensate asymmetric mode pulling. The etalons may be implemented with a single monolithic device, or with two or more separate etalon components separated by air gaps.

Other applications may be embodied in an external cavity laser. The gain medium may, by way of example and not of limitation include first and second facets and emit a light beam from the first facet. An etalon element may be positioned in the beam, with a reflective element positioned in the beam after the etalon element. The reflective element serves as an end mirror and defines an external laser cavity with the second facet of the gain medium. The wavelength selection element may include a grating, a prism, an interference filter, another etalon element, or any other component that allows wavelength selection, and may be positioned in the beam before or after the etalon element. The wavelength selection element may be tunable by thermo-optical, electro-optical, acousto-optical, piezo, mechanical translation and/or rotation, or other tuning mechanism or effect, one or more of which may be used jointly to effect tuning. The gain medium may include a diode emitter or a flash-lamp pumpable or electrically pumpable crystal, dye, gas or other gain medium.

In operation, the beam emitted by the gain medium passes through the etalon element and wavelength selection element, reflects off the end mirror, and returns through the etalon and wavelength selection elements to the gain medium. The wavelength selection element and etalon element are configured to return light to the gain medium at a single, selectable wavelength to allow single mode lasing. The asymmetry of the transmission peaks or pass bands serves to compensate for asymmetric mode pulling that arises during single mode laser operation.

Referring more specifically to the drawings, embodiments of the present invention are illustrated in the apparatus and graphical representations shown in FIGS. 1–5. In light of this disclosure, it will be appreciated that the apparatus may vary as to configuration and as to details of the parts, and that the method may vary as to details and the order of the acts, without departing from the basic concepts as disclosed herein. Embodiments of the invention are described primarily in terms of etalon devices and wavelength lockers, and in terms of use with external cavity lasers configured for use as a telecommunication transmitter. Embodiments of the invention, however, may be implemented in grating devices and combinations of gratings and etalons, and may be used with various types of laser devices and optical systems. It should also be understood that the terminology used herein is for the purpose of describing particular embodiments only, and is not intended to be limiting, since the scope of the present invention will be limited only by the appended claims. The relative sizes of components and distances therebetween as shown in the drawings are in many instances exaggerated for reason of clarity, and should not be considered limiting.

Embodiments of the invention provide etalon devices that create an asymmetric power transfer function, external cavity lasers using such etalon devices, and methods related the etalon devices. The asymmetric power transfer function provided by embodiments of the invention can compensate for asymmetric mode pulling effect that can occur in external cavity lasers, and allows increased wavelength stability during laser operation.

External cavity lasers in many instances include a diode gain medium with a first, antireflection-coated facet and a second, reflective or partially reflective facet, together with an end reflector or mirror. The end mirror and reflective facet of the gain medium define the external laser cavity. A wavelength locker or grid generator defines a set of discrete, equally spaced wavelength channels or transmission peaks that may, for example, correspond to the International Telecommunications Union (ITU). The grid generator often includes a solid or air-gap etalon, located within the external cavity, that is thermally stabilized to provide multiple discrete, evenly spaced channels or transmission peaks. Selection of individual transmission peaks of the grid etalon is achieved by adjustment of a tunable element such as a grating, filter or tunable etalon that is also positioned in the external cavity. A discretely tunable external cavity laser using intra-cavity grid generator and a tunable etalon is disclosed in U.S. Pat. No. 6,205,159.

To provide wavelength locking and minimize cavity loss during operation of the external cavity laser, the external cavity length is adjusted so that it remains equal to an integer multiple of the half wavelength ($\lambda/2$) of the selected grid etalon transmission peak. Cavity length adjustment may be carried out by a servo loop that maximizes laser output power or minimizes voltage across the diode gain medium. Cavity length adjustment may be achieved via a phase compensator associated with the end mirror, or active thermal adjustment or mechanical translation of the end mirror. Adjustment or servoing of the cavity length may be carried out according to error signals derived from the monitoring of laser output power or monitoring the voltage across the diode gain medium.

Two effects known as "asymmetric gain saturation" and "asymmetric mode pulling" can result in unwanted "mode-hopping" associated with external cavity modes that are in close proximity to a selected transmission peak. This complicates the servoing of the external cavity length with respect to the selected grid etalon transmission peak and results in unstable laser operation.

Asymmetric gain saturation arises during single mode lasing at a selected wavelength due, in part, to an effect known as "spectral hole burning" (N. Ogasawara and R. Ito; Japanese Journal of Applied Physics, v. 27, No. 4, pp. 607–614). The gain on the shorter wavelength side of the lasing mode is strongly suppressed while that on the longer wavelength side is slightly enhanced. As a result, the mode hop occurs when the shorter wavelength mode is closer to the transmission peak of the grid generator than the longer wavelength mode. This effect is dependent upon photon density and can be substantial at high laser output power.

Asymmetric mode pulling is related to the dependence of the diode gain medium refractive index on the concentration of free carriers, which in turn is related to the external cavity loss. As external cavity length increases, the cavity mode adjacent to the selected grid etalon transmission peak passes through the transmission peak, resulting in effective etalon transmission change together with a corresponding carrier density change, which in turn changes the refractive index of the diode gain medium. This causes an acceleration of the phase accumulation on the short wavelength or higher frequency side of the etalon transmission peak, and a deceleration of the phase accumulation on the long wavelength or lower frequency side of the transmission peak. The overall effect is an asymmetric dependence of the diode threshold current (and laser output power) on the external cavity length, with the transmission peak effectively shifted in the direction of shorter wavelength.

The effects of asymmetric gain saturation and asymmetric mode puling described above create asymmetry of the same sign causing mode hop to occur almost at the same cavity length as that required to achieve lasing at the transmission peak of the etalon. Servo operations to lock the cavity length to the transmission peak of the grid etalon thus becomes unreliable and laser operation becomes accordingly unstable, as noted above. In situations where the laser is operated at high power and/or there is high residual reflectivity in the anti-reflection coated facet of the gain medium, the transmission peak of the etalon may be unreachable, making the etalon unusable as a wavelength locker.

Figure 1:
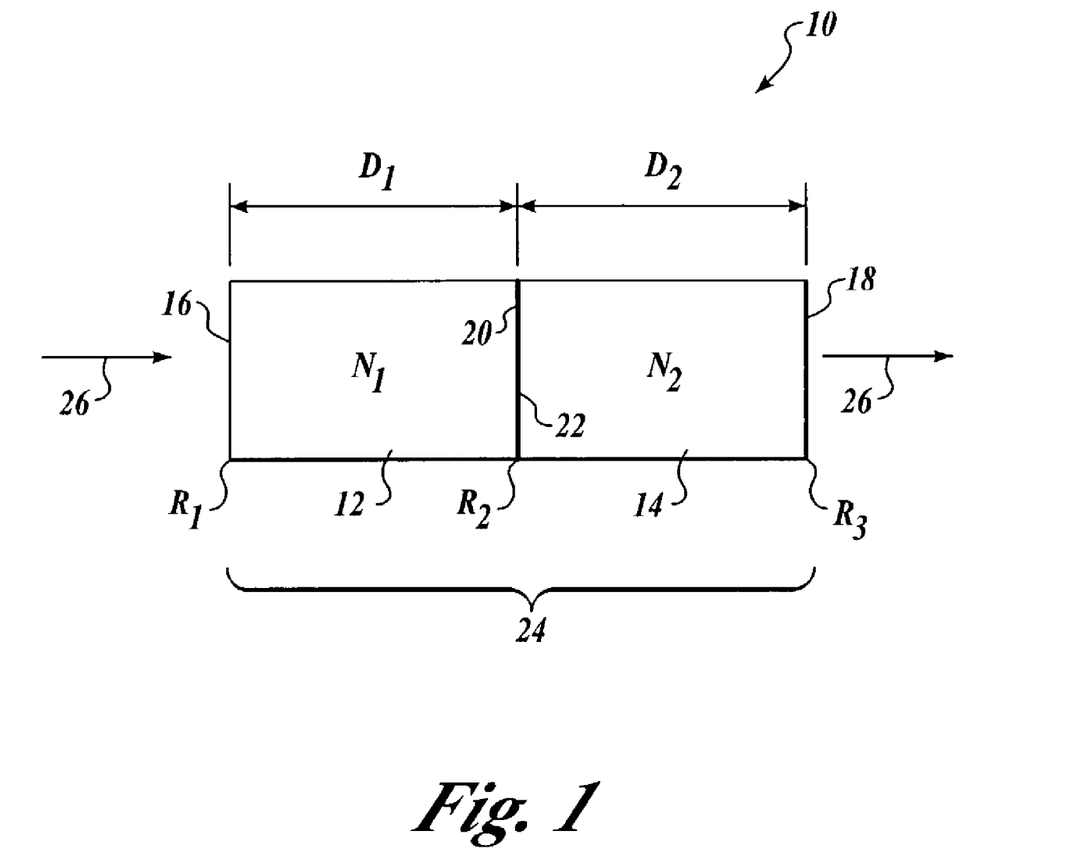
FIG. 1 is a schematic representation of an etalon apparatus with an asymmetric power transfer function in accordance with an embodiment of the present invention, shown in cross-section.

With the above in mind, reference is now made to FIG. 1, wherein an etalon apparatus 10 in accordance with one embodiment of the present invention is shown. The etalon apparatus 10 includes a first, bulk Fabry-Perot etalon 12, and a second, adjacent bulk Fabry-Perot etalon 14 that together act as a complex etalon to provide an asymmetric power transfer function as described below. Etalons 12 and 14 may be implemented as solid etalons of optically transparent material that are positioned adjacent to each other and joined together such that the etalon apparatus 10 is a single, monolithic device. In other embodiments, one of etalons 12 and 14 may be solid while the other etalon is an air-gap or gas-filed etalon that is defined by an adjacent substrate (not shown).

Etalons 12 and 14 together define a first reflective surface $R_1$, a second reflective surface $R_2$, and a third reflective surface $R_3$, which are parallel or substantially parallel to each other. Reflective surface $R_1$ is located on an outer surface 16 of etalon 12, while reflective surface $R_3$ is located on an outer surface 18 of etalon 14, and reflective surface $R_2$ is located at the adjacent inner surfaces 20 and 22 of etalons 12 and 14 respectively. The outermost surfaces 16 and 18 of etalons 12 and 14 define an additional third etalon 24 with reflective surfaces $R_1$ and $R_3$. The terms "reflective" and "reflectivity" as used herein to describe surfaces $R_1$, $R_2$ and $R_3$ should be understood as meaning partially reflective as well as partially transmissive, so that a light beam may pass through each of surfaces $R_1$, $R_2$ and $R_3$. The reflectivity of surfaces $R_1$, $R_2$ and $R_3$ will vary in different embodiments of the invention. In many embodiments, $R_1$ and $R_2$ may be approximately equal to each other, with $R_1$ and $R_2$ each being individually greater than $R_3$ (i.e., $R_1 \approx R_2 > R_3$ and, in some embodiments, $R_1 \approx R_2 >> R_3$).

Any desired reflectivity for surfaces $R_1$, $R_2$ and $R_3$ may be obtained by conventional mirror forming techniques such as, for example, deposition of one or more quarter wave ($\lambda/4$) dielectric pair layers on a surface to create a dielectric mirror of selected reflectivity. In most embodiments reflective surfaces $R_1$ and $R_2$ will each have a reflectivity in the range of between about 30% and about 90% reflectivity, and reflective surface $R_3$ will have a reflectivity in the range of between about 1% and about 20% reflectivity. These ranges may be exceeded, however, in certain embodiments.

Etalon 12 has a physical thickness $D_1$ and a refractive index $n_1$, and provides an optical path length of $D_1 n_1$ to a light beam 26 traveling through etalon 12. Etalon 14 similarly is shown with a physical thickness $D_2$ and a refractive index $n_2$, such that an optical path length of $D_2 n_2$ is provided for light beam 26 traveling through etalon 14. The optical path length of etalon 24 is equal to the sum of the optical path lengths for etalons 12 and 14. The relationship of optical path lengths $D_1 n_1$ and $D_2 n_2$ varies in different embodiments of the invention. In certain embodiments, $D_2 n_2 \approx D_1 n_1 + 0.22\lambda + N(\lambda/2)$ wherein X is a selected wavelength and N is 0 or an integer. In specific embodiments as described below, $D_2 n_2 = D_1 n_1 + 0.22\lambda + N(\lambda/2)$ where N=0, 1 or 2. In most embodiments, the optical path lengths $D_2 n_2$ and $D_1 n_1$ will be within approximately one or two percent of each other, but in certain embodiments may differ from each other by a larger percentage. The magnitude of optical path lengths $D_1n_1$ and $D_2n_2$ may be varied by change in refractive index and/or physical thickness.

In many embodiments, etalons 12 and 14 are solid etalons having the same material, and are controlled in thickness to provide the desired optical path lengths $D_1n_1$ and $D_2n_2$. Suitable solid etalon materials include, for example, BK7 glass and fused silica, as well as semiconductor materials and other materials that are transmissive at particular wavelengths of interest. In certain embodiments, etalons 12 and 14 may include silicon, which is transparent in the near infrared region used for telecommunication bands, and which provides a relatively loose tilt tolerance for the etalon apparatus 10. The use of silicon etalon material also allows control of optical path lengths $D_2n_2$ and $D_1n_1$ via thermo-optic tuning as described further below.

Figure 2A:
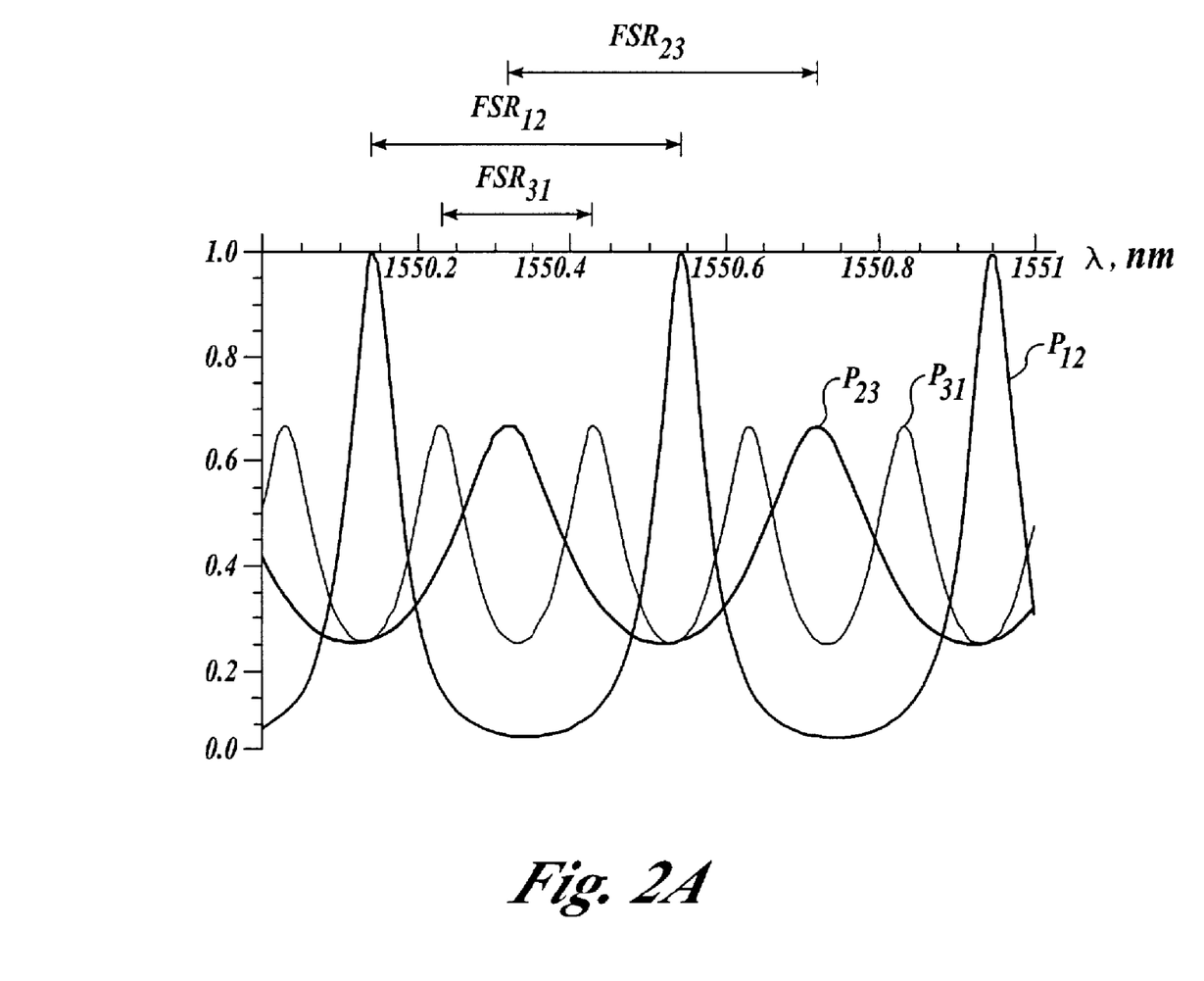
FIG. 2A is a graphical representation of the power transfer functions of the etalons $R_1R_2$, $R_1R_3$, and $R_2R_3$ of the etalon apparatus of FIG. 1.

Referring also to FIG. 2A, the etalons 12, 14 and 24 each define a different power transfer function. The power transfer functions as shown in FIG. 2A are shown graphically as relative transmission (vertical axis) versus wavelength (horizontal axis). Etalon 12 has a power transfer function with a series or plurality of transmission peaks shown as $P_{12}$ (according to reflective surfaces $R_1$ and $R_2$), with a free spectral range of $FSR_{12}$. Etalon 14 defines a power transfer function with a series of transmission peaks shown as $P_{23}$ (according to reflective surfaces $R_2$ and $R_3$) with a free spectral range of $FSR_{23}$. The etalon 24 defined by the outermost surfaces 16 and 18 of etalons 12 and 14, has a power transfer function with a plurality of transmission peaks shown as $P_{31}$ (according to reflective surfaces $R_3$ and $R_1$), and a free spectral range $FSR_{31}$. The free spectral ranges $FSR_{12}$, $FSR_{23}$ and $FSR_{31}$ may vary in magnitude, depending upon different embodiments of the invention. In many embodiments, $FSR_{23}$ will be within plus or minus one or two percent of $FSR_{12}$, but may differ by larger amounts in certain embodiments. $FSR_{31}$ will be smaller than $FSR_{12}$ and $FSR_23$, and in many embodiments $FSR_{31}$ may be equal to approximately one half of $FSR_{12}$.

Etalon 12 serves as a "primary" etalon and has a finesse (free spectral range divided by full width half maximum or FWHM) that is greater than that of etalon 14 or etalon 24. The free spectral range and linewidth requirements for primary etalon 12 are the same as for a conventional wavelength locker. The transmission peaks $P_{12}$ of etalon 12 define selectable wavelengths or channels for single mode operation of an external cavity laser, at selected wavelengths, as described further below. Etalons 14 and 24 serve as "secondary" etalons, and generate transmission peaks $P_{23}$ and $P_{31}$ that are shifted in wavelength from the transmission peaks $P_{12}$ of primary etalon 12. The secondary etalons 14 and 24 introduce asymmetry or otherwise change the slope $dT/d\lambda$ of the transmission peaks $P_{12}$ of the primary etalon 12. In other embodiments, etalon 14 may alternatively be configured to serve as the primary etalon.

Figure 2B:
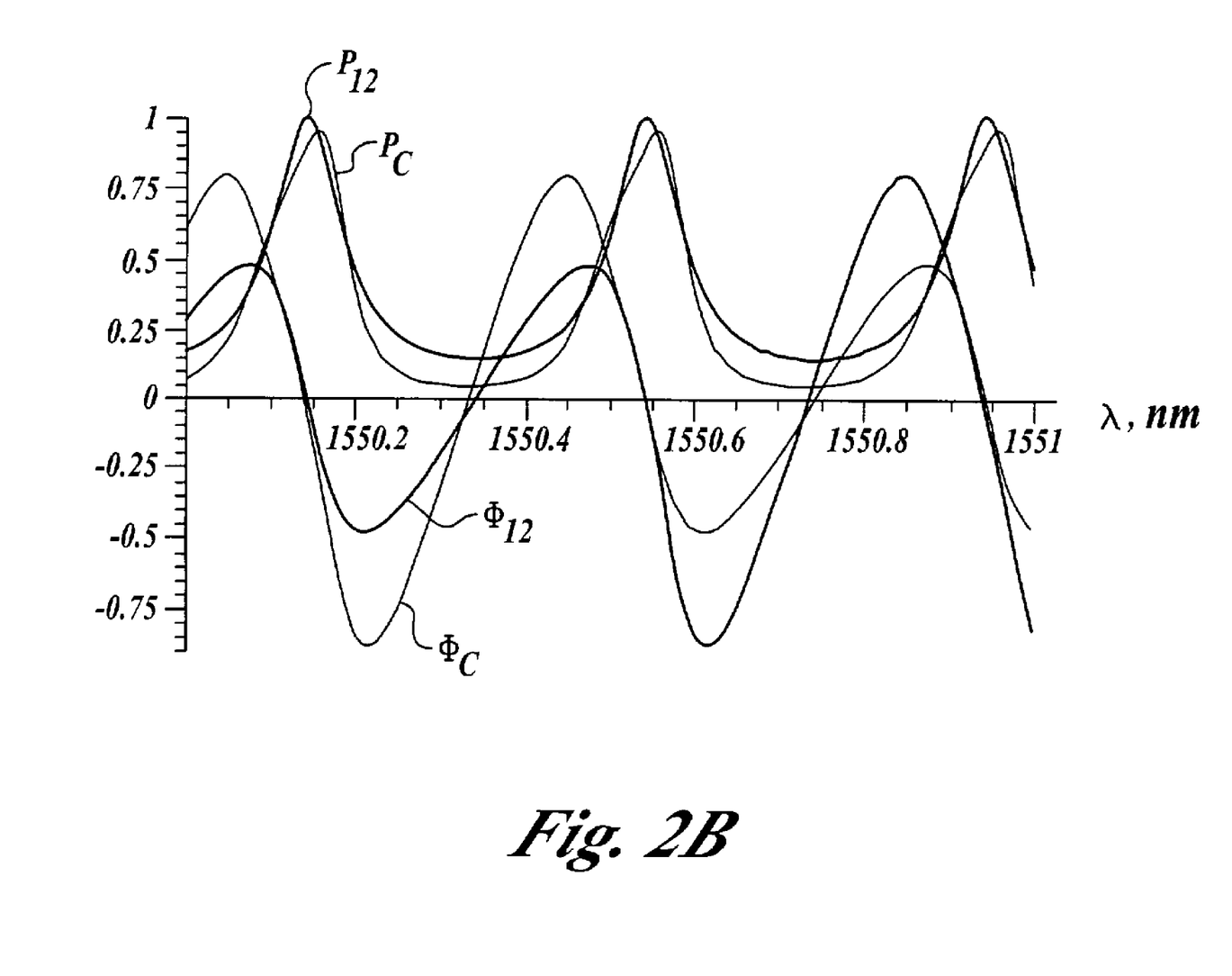
FIG. 2B is a graphical representation of the combined power transfer function ($P_C$) and phase anomaly ($\Phi_C$) of the etalon apparatus of FIG. 1, shown together with the power transfer function ($P_{12}$) and phase anomaly ($\Phi_{12}$) of a simple Fabry-Perot etalon.
Figure 2C:
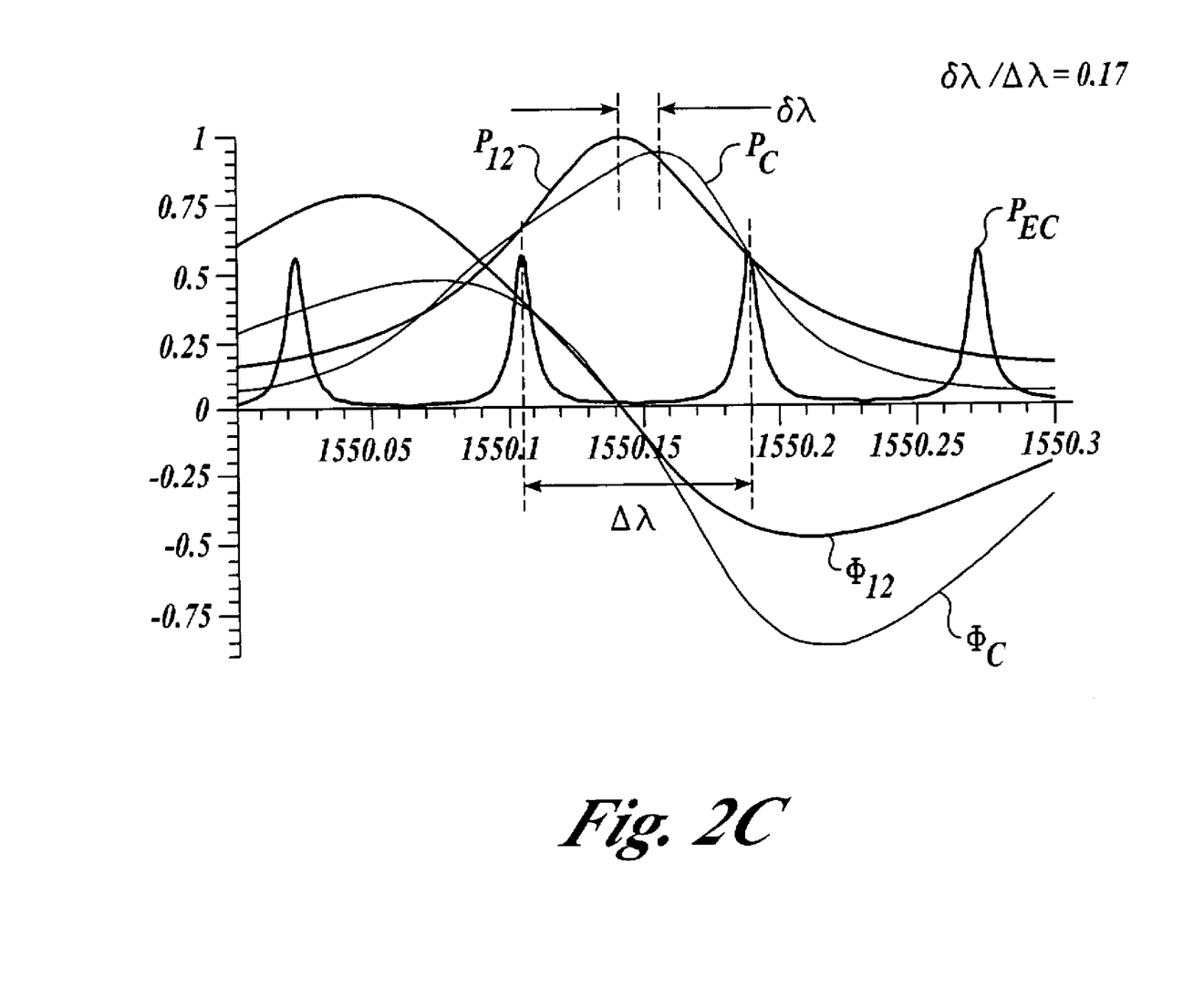
FIG. 2C is a graphical representation of the power transfer functions and phase anomalies of FIG. 2B at approximately 1550.15 nanometers, shown together with external cavity mode peaks.

The combined effect of etalons 12, 14 and 24 in the etalon apparatus 10 is a "complex etalon", and results in the complex or asymmetric power transfer function $T(\lambda)$ illustrated in FIG. 2B and FIG. 2C as asymmetric or complex transmission peaks $P_C$. As can be seen, transmission peaks $P_C$ are asymmetric and each have a slope on the short wavelength (leftmost) side that is less steep or shallower than the slope on the long wavelength (rightmost) side, i.e., the slopes $dT/d\lambda$ on the two sides of each transmission peak $P_C$ are different from each other. For comparison purposes, the symmetric transmission peaks $P_{12}$ of etalon 12, as provided by etalon 12 standing alone (without the effects of secondary etalons 14 and 24) are shown in FIG. 2B as well, to illustrate the asymmetric power function provided by the etalon apparatus 10. Curves $\Phi_C$ and $\Phi_{12}$ in FIGS. 2B and 2C show phase anomaly for the complex etalon and etalon 12, respectively. One can see that complex etalon has the same phase slope ($d\Phi/d\lambda$) as etalon 12 on the short wavelength side of the transmission peak $P_C$.

As can also be seen in FIGS. 2B and 2C, the complex transmission peaks $P_C$ are shifted to longer wavelength than the corresponding transmission peaks $P_{12}$. This shift in wavelength, the particular shape or slopes of transmission peaks, as well as the magnitude and direction of the asymmetry introduced into the complex transmission peaks, may be selected with precision by selective configuration of etalons 12, 14 and 24 of the etalon apparatus 10 using conventional etalon fabrication techniques as described below.

For exemplary purposes, transmission peaks $P_{12}$ and $P_C$ are shown in FIGS. 2A and 2B as configured to define wavelength channels with channel separations of 0.4 nanometers (50 GHz). The transmission peaks $P_{12}$, $P_{23}$ and $P_{31}$ as shown in FIG. 2A and asymmetric peaks $P_C$ in FIG. 2B correspond to an etalon apparatus 10 wherein the reflective surfaces $R_1$ and $R_2$ each have a reflectivity of 57%, reflective surface $R_3$=10% reflectivity, optical path length $D_1n_1$=2.99720 millimeters, and optical path length $D_2n_2$=2.99754 millimeters. For illustrative purposes, the peaks $P_{12}$ as shown in FIGS. 2B and 2C are shown according to reflectivities $R_1$=$R_2$=46% (instead of $R_1$=$R_2$=57% as in FIG. 2A), in order to better show the asymetry introduced to peaks $P_C$.

In the embodiment shown in FIGS. 2A–2C, $D_2n_2$=$D_1n_1$+$0.22\lambda$+$N(\lambda/2)$ as noted above, with $\lambda$ in this case being the center wavelength of the C transmission band ($\lambda$=1550 nanometers), and N=0. With $D_1n_1$=2.99720 millimeters and $D_2n_2$=2.99754 millimeters, transmission peaks $P_C$ are spaced apart by, or have a free spectral range of, 0.4 nanometers. This relationship for $D_1n_1$ and $D_2n_2$ is such that $FSR_{23}$ is within 0.05% of $FSR_{12}$, and an $FSR_{31}$ that is approximately one half of $FSR_{12}$. The resulting transmission peak shift between primary etalon peaks $P_{12}$ and secondary etalon peaks $P_{23}$ remains constant over the entire C band.

This particular relationship for $D_1n_1$ and $D_2n_2$ can be achieved by the polishing surfaces 16,18, 20 and 22 of the etalons 12 and 14 individually down to approximately 100 nanometer tolerance, followed by thin film deposition of index-matched material on the surfaces, using active thickness control, to provide a desired thickness. For the best performance, the relationship $D_2n_2$=$D_1n_1$+$0.22\lambda$+$N(\lambda/2)$ should have an accuracy of at least $\pm\lambda/50$. At $\lambda$=1550 nanometers, BK7 glass and fused silica have a thickness tolerance of approximately $\pm21$ nanometers, which can be achieved using conventional polishing and deposition techniques for etalon fabrication in embodiments wherein etalons 12 and 14 include BK7 glass or fused silica. Alternatively, in embodiments where etalons 12 and 14 include materials of different refractive index, the etalon apparatus 10 may be tilt adjusted after surface polishing to provide the desired optical path length difference $D_2n_2-D_1n_1$.

For silicon etalons, the thickness tolerance at $\lambda=1550$ nanometers is approximately ±9 nanometers, which also can be achieved using conventional polishing and deposition techniques. Where etalons 12 and 14 include BK7 glass, fused silica or silicon, the reflective surfaces $R_1$, $R_2$ and $R_3$ may be formed by selective deposition of $Si/SiO_2$ quarter wave layers to form suitable dielectric mirrors such that $R_1=R_2=57\%$ and $R_3=10\%$ as noted above.

The etalon apparatus 10 is usable for wavelength locking in an external cavity laser, as noted above. In this regard, FIG. 2C illustrates the relationship of a complex transmission peak $P_C$ and primary etalon transmission peak $P_{12}$ with external cavity modes or peaks $P_{EC}$. The spacing and location of cavity mode peaks $P_{EC}$ result from the external cavity length, which is generally based on the positional relationship of the laser gain medium facet and an end mirror that define the external cavity. FIG. 2C shows cavity modes $P_{EC}$ for the cavity length that corresponds to mode hop. Due to asymmetric gain saturation described above mode hop occurs when the shorter wavelength mode has higher transmission and therefore located closer to the peak of the etalon $P_{12}$ than the longer wavelength mode (dashed lines in FIG. 2C).

Due to the asymmetric mode pulling effect described above, peak $P_{12}$ plotted against cavity length is actually distorted so that its shorter cavity slope gets steeper than the longer cavity slope. This distortion effectively moves peak $P_{12}$ even closer to the cavity length that corresponds to mode hop, which hinders the maintenance of the lasing mode at the transmission peak $P_{12}$ by a servo system. The asymmetry present in the complex peak $P_C$, which is shifted in the longer wavelength direction by an amount $\delta\lambda$, compensates or corrects for the asymmetric mode pulling effect and allows more stable single mode laser operation at high output power levels than has previously been achievable.

FIG. 2C, as noted above, illustrates a primary etalon peak $P_{12}$ and a complex transmission peak $P_C$ that are produced when the etalon apparatus 10 is configured as a wavelength locker for the telecommunication C band, with a channel spacing of 0.4 nanometers (50 GHZ). For typical diode gain media having a gain bandwidth that encompasses the C band undergoing single mode operation in the C band, an asymmetry or shift in peak $P_C$ of $\delta\lambda/\Delta\lambda \approx 0.17$ in the longer wavelength direction, as shown in FIG. 2C, provides effective compensation for the asymmetric mode pulling effect. This particular value for $\delta\lambda/\Delta\lambda$ is provided by the etalon configurations discussed above for the etalon apparatus 10. For different channel spacings and use at different wavelength regions, the etalons 12 and 14 may be configured accordingly to provide an optimal asymmetry to peaks $P_C$ to correct for the asymmetric mode pulling effect.

The etalons 12 and 14 of the etalon apparatus 10 may be embodied in a variety of configurations and positional relationships as will be apparent to those skilled in the art, and the particular arrangement shown in FIG. 1 is only exemplary. One or more additional etalons (not shown) may be employed in the apparatus and methods of the invention to provide a variety of complex power transfer functions. Further, one or more of the etalons in the apparatus may be tunable by various techniques as described below such that the channel separation and/or asymmetry of the complex transmission peaks $P_C$ can be actively controlled during laser operation.

Figure 3:
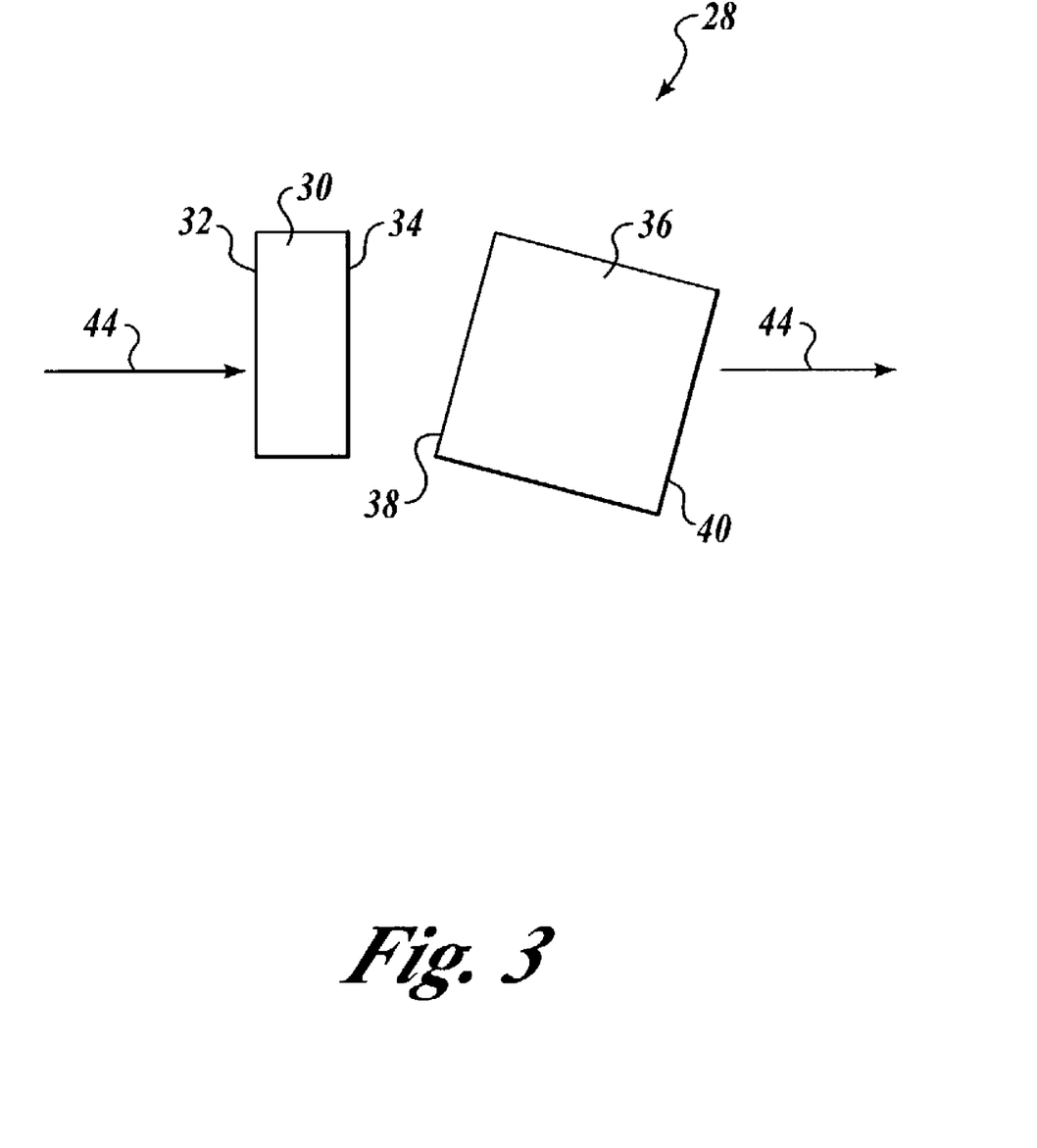
FIG. 3 is a schematic representation of another embodiment of an etalon apparatus with an asymmetric power transfer function in accordance with the invention.

Referring now to FIG. 3, there is shown another etalon apparatus 28 that provides an asymmetric power transfer function in accordance with the invention. The apparatus 28 includes a first etalon 30 with facets or surfaces 32 and 34, and a second etalon 36 with facets or surfaces 38 and 40. Etalons 30 and 36 may be made of any optically transmissive materials of desired refractive indices, as noted above, and may include the same or different materials. Etalons may be polished to control thickness, together with controlled surface deposition and/or tilt adjustment to meet the tolerances necessary for use in desired wavelength ranges and desired channel spacings. The surfaces 32, 34, 38 and 40 of etalons 30 and 36 may be adjusted to desired levels of reflectivity by the techniques described above.

Etalon 30 is a primary etalon and operates in light beam 44 to define a plurality of transmission peaks as described above, which may correspond, for example, to the ITU transmission peaks of the C band as also related above. Etalon 36 serves as a secondary etalon to provide asymmetry to the transmission peaks and, together with primary etalon 30, define complex transmission peaks in the manner described above to compensate for asymmetric mode pulling during single mode laser operation. The free spectral ranges of etalons 30 and 36 may be varied as required for desired configuration of the complex power transfer function.

In many embodiments etalons 30 and 36 will have free spectral ranges that are approximately or nominally equal, with a difference within 0.05% as described above. In the embodiment shown in FIG. 3, etalon 36 is configured and positioned to provide a free spectral ranges that is approximately one half that of the free spectral range of the primary etalon 30, in order to provide a steeper phase slope. For use of the apparatus 28 as a wavelength locker in the C band with ITU grid spacings, etalons 30 and 36 may include silicon etalons of approximately 0.83 millimeter thickness, and 1.67 millimeter thickness respectively, with surface reflectivities like those described above for the etalon apparatus 10. The secondary etalon 36 should be positioned and configured to provide transmission peaks that are shifted by approximately 6 GHz from the transmission peaks of the primary etalon.

The apparatus 28 of FIG. 3 conveniently allows independent tilt tuning of the primary and secondary etalons 30 and 36 to provide control of the complex power transfer function. Tilt tuning should be carried out in a manner that avoids cross coupling. Etalons of high refractive index materials such as silicon provide the best results for generation of complex power transfer functions at C band wavelengths using the apparatus 28. The apparatus 28 is also well suited for selective individual thermal tuning of etalons 30 and 36 to provide control of channel frequencies and/or the level of asymmetry introduced to the transmission peaks, as described more fully below. Due to the spacing of etalons 30 and 36, more space along the optical axis is required, and this embodiment is most suitable for use in external cavity lasers wherein small size and compact design is not required. As with the etalon apparatus 10 described above, numerous different configurations of the apparatus 28 are possible and will suggest themselves to those skilled in the art upon review of this disclosure.

Figure 4:
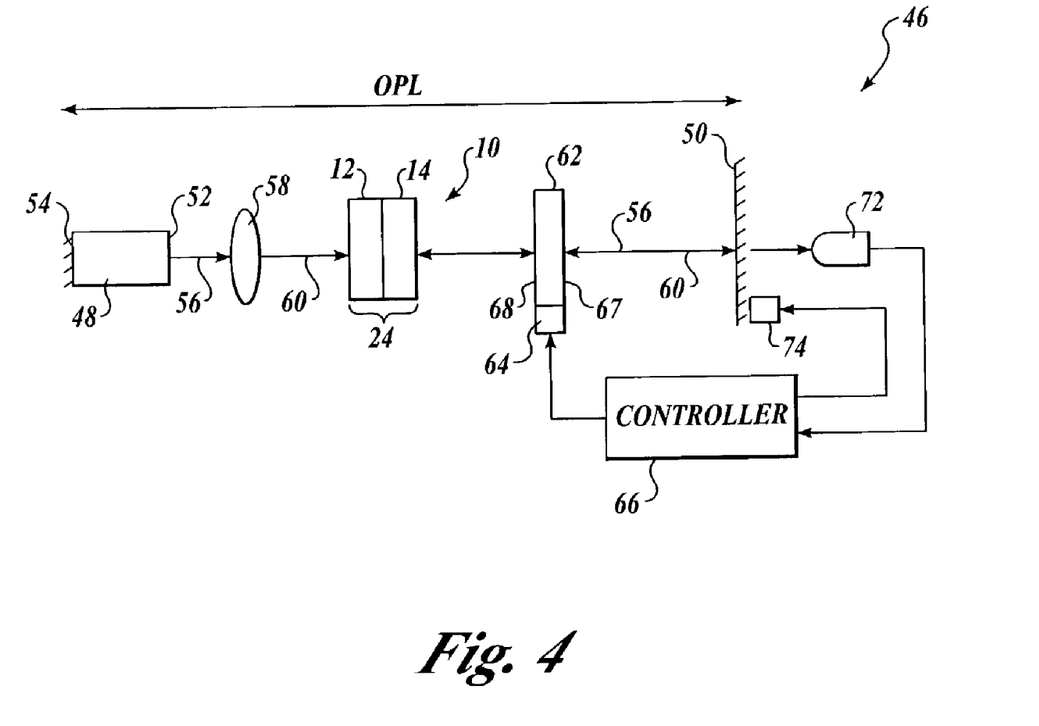
FIG. 4 is a schematic representation of an external cavity laser apparatus in accordance with an embodiment of the invention.

Referring now to FIG. 4, there is shown a laser apparatus 46 in accordance with the invention that utilizes the etalon apparatus 10 as an internal wavelength locker. Like reference numbers are used to denote like parts. The apparatus 46 includes a gain medium 48 and an end or external reflective element 50. Gain medium 48 may include a conventional Fabry-Perot diode emitter chip and has an anti-reflection (AR) coated front facet 52 and a reflective or partially reflective rear facet 54. Reflective element 50 may include a conventional mirror or other reflective or retroreflective element. An external laser cavity of optical path length OPL is delineated by rear facet 54 and end mirror 50. Gain medium 48 emits a light beam 56 from front facet 52 that is collimated by lens 58 to define an optical path 60. Conventional output coupler optics (not shown) may be associated with rear facet 54 for coupling output from rear facet into an optical fiber (also not shown).

A wavelength locker 10 (substantially similar to etalon apparatus 10 of FIG. 1) capable generating an asymmetric power transfer function is positioned in optical path 60, and operates as an interference filter to give rise to a multiplicity of maxima within the communication or C band at wavelengths which coincide with the center wavelengths of a wavelength grid such as the ITU (International Telecommunications Union) grid. Other wavelength grids may alternatively be selected, as noted above. The primary etalon 12 of wavelength locker 10 has a free spectral range that corresponds to the spacing between the grid lines of the ITU grid, and the grid wavelength locker thus operates to provide a plurality of pass bands centered on each of the gridlines of the wavelength grid. Primary etalon 12 has a finesse that is configured to suppress neighboring modes of the external cavity laser between each channel of the wavelength grid. Secondary etalons 14 and 24 are configured to introduce asymmetry to the transmission peaks of primary etalon 12 in the manner related above.

The apparatus 46 includes a tunable wavelength selection element 62 that is shown in FIG. 4 as an etalon 62 positioned in optical path 60 between wavelength locker 10 and end mirror 50. Wavelength locker 10 may alternatively be positioned in optical path 60 after the tunable element 62 or elsewhere. The tunable etalon 62 acts as an interference filter that is adjustable to select one of the transmission peaks defined by wavelength locker 10. Tuning etalon 62 may include, for example, a tapered transparent substrate, a tapered air gap between the reflective surfaces of adjacent transparent substrates, a thin film "wedge" interference filter, or other etalon structure. A tuning device or driver 64 is operatively coupled to tunable etalon 62 to provide adjustment to etalon 62 in a manner that effects tuning to desired wavelengths. Various tuning mechanisms may be utilized, as described below. Tuning device 64 is operatively coupled to a controller 66, which may include a conventional data processor that provides instructions or signals to tuning device 64 for adjustment of etalon 62 to select desired wavelengths.

Tuning etalon 62 in certain embodiments may provide for wavelength selection by defining transmission or pass bands that are substantially broader than the pass bands of the wavelength locker 10, with the broader pass bands of the tuning etalon 62 having a periodicity corresponding to or larger than the separation between the shortest and longest wavelength channels defined by the wavelength locker 10 within the bandwidth of the gain medium 48 Tuning of external cavity lasers in this manner is described in U.S. patent application Ser. No. 09/814,464 filed Mar. 21, 2001 the disclosure of which is incorporated herein by reference. In other embodiments, tuning etalon 62 may define a plurality of transmission or pass bands that interact with the pass bands of wavelength locker in a Vernier effect to allow selection of specific channel wavelengths. Tuning in this manner is described in U.S. patent application Ser. No. 09/626,526 filed on Jul. 27, 2000 and incorporated herein by reference. Tuning etalon 62 has a finesse that suppresses channels adjacent to a particular selected channel.

The tuning etalon 62 selects between the multiple communication channels defined by wavelength locker 10 by changing the optical thickness or path length between faces 67 and 68 of tuning etalon 62. This may be achieved by, for example thermo-optic tuning by selective heating and cooling of the etalon 62 to selectively vary the refractive index of the material of etalon 62 and/or vary the physical distance between faces 67 and 68 of etalon. In this regard, tuning device 64 may include a thermal control element which can monitor the temperature of etalon 62, and heat or cool the etalon 62 according to instructions from controller 66 to provide selective wavelength tuning. Thermo-optic tuning of an etalon in this manner is described in U.S. patent application Ser. No. 10/099,649 filed Mar. 15, 2002 and incorporated herein by reference. Etalon 62 may also be tuned via electro-optic effect wherein selective application of potential across etalon 62 provides variation in optical path length between faces 67 and 68 of etalon, to allow wavelength selection. Tuning of etalon 62 may be based on piezo-electric and acousto-optic mechanisms, as well as various other tuning mechanisms.

The facets 67 and 68 of etalon 62 may be tapered, such that tuning by etalon 62 may be achieved by translating or driving tuning etalon 62 in a direction that is substantially perpendicular to optical path 60, as described in U.S. patent application Ser. No. 09/814,464 noted above. In this case, tuning device 64 may include a mechanical actuator to positionally drive etalon 62. As the tuning etalon 62 is advanced or translated into optical path 60, the beam 56 traveling along optical path 60 passes through increasingly thicker portions of tuning etalon 62, which support constructive interference between opposing faces 67 and 68 at longer wavelength channels. As tuning etalon 62 is withdrawn from optical path 60, the beam 56 will experience increasingly thinner portions of tuning etalon 62 and expose pass bands to the optical path 60 that support correspondingly shorter wavelength channels. The free spectral range of tuning etalon 62 may correspond to or be grater than the complete wavelength range of the channel grid defined by wavelength locker 10 within the bandwidth of the gain medium 48 as noted above, so that a single loss minimum within the communications band can be tuned across the wavelength grid. Alternatively, tuning etalon 62 may have a free spectral range that defines a plurality of pass bands within the wavelength range of the channel grid provided by wavelength locker, such that Vernier tuning can be carried out for wavelength selection as noted above. In either case, the combined feedback to gain medium 48 from the external cavity containing wavelength locker 10 and tuning etalon 62 support lasing at the center wavelength of a selected channel.

Tuning etalon 62 as shown in FIG. 4 represents only one type of tunable element or channel selector that may be used with the invention. Etalon 62 may be replaced with a variety of tunable elements other than an etalon, such as grating devices, prisms, electro-optic devices, liquid crystal devices, and movable reflectors used in conjunction with gratings or prisms. The use of a tapered air gap etalon as a channel selector is described in U.S. Pat. No. 6,108,355, wherein the "wedge" is a tapered air gap defined by adjacent substrates. The use of pivotally adjustable grating devices as channel selectors tuned by grating angle adjustment and the use of an electro-optic tunable channel selector tuned by selective application of voltage are described in U.S. patent application Ser. No. 09/814,464 noted above. Gratings as tunable elements may be chirped or un-chirped and may be used in transmission or reflection. Tuning may be achieved by stationary grating in conjunction with a movable mirror as in the well-known Littman-Metcalf external cavity laser configuration. The use of a translationally tuned graded thin film interference filter is described in U.S. patent application Ser. No. 09/814,464 and in U.S. patent application Ser. No. 09/900,412 filed on Jul. 6, 2001 and incorporated herein by reference. The aforementioned disclosures are incorporated herein by reference. Various other tunable elements and tuning mechanisms usable with external cavity lasers will suggest themselves to those skilled in the art, and are also considered to be within the scope of this disclosure.

As shown in FIG. 4, end mirror 50 is partially transparent, and an optical detector 72 is positioned behind mirror 50 to receive the portion of beam 56 that passes through mirror 50. Detector 72 is operatively coupled to controller 66 and monitors the optical power of the apparatus 46. A tuning device 74 is operatively coupled to controller 66 and to end mirror 50, and provides selective control of the external cavity optical path length OPL, according to instructions from controller 66. Detector 72, controller 66 and tuning device 74 together provide a servo system for monitoring the optical output of the apparatus 46, and adjusting the external cavity optical path length OPL according to error signals derived from the monitoring of output by detector 72. Servo systems of this type are well known in the art. The servoing of the cavity optical path length according to error signals obtained from monitored laser output allows the selected cavity mode to remain centered on the transmission peak of the wavelength locker 10, as described above.

Control of optical path length OPL may be achieved by mechanical positioning of end mirror 50 with respect to the back facet 54 of gain medium. In such embodiments, tuning device 74 may include a suitable mechanical translator to positionally drive mirror 50 according to error signals generated by the servo system. In other embodiments, tuning device 74 may include a phase compensator element to provide optical path length adjustment via electro-optic tuning. In still other embodiments, end mirror 50 may be positioned using active thermal control wherein tuning device includes a thermal compensating element that is selectively heated and cooled to position mirror 50 according to expansion and contraction of the compensating element. Active thermal control of external cavity optical path length is described in U.S. patent application Ser. No. 09/900,443 filed on Jul. 6, 2001 and incorporated herein by reference.

Various other arrangements of the servo system may be used. For example, detector 72 may be positioned to measure optical output from facet 54 of gain medium 48, or may be positioned to monitor a portion of beam 56 that is picked off from optical path 60 by a pickoff element (not shown) and directed to detector 72. Adjustment of the external cavity optical path length may be achieved by adjusting the position of facet 54 (i.e., adjust the position of gain medium 48), instead of, or in addition to, that of end mirror 50. In some embodiments, monitoring of laser output may be carried out by monitoring the voltage across the gain medium 48, from which error signals are derived for adjusting external cavity optical path length. The use of monitored voltage across a diode gain medium for external cavity optical path length adjustment is described in U.S. patent application Ser. No. 09/900,426 filed on Jul. 6, 2001 and incorporated herein by reference. Additional servo systems for use with the invention will suggest themselves to those skilled in the art.

In the operation of the apparatus 46, the beam 56 emitted by facet 52 of gain medium 48 passes through wavelength locker 10 and tunable etalon 62, reflects off end mirror 50, and returns through etalon 62 and wavelength locker 10 to gain medium. Wavelength locker 10 provides an asymmetric power transfer function with a plurality of asymmetric transmission peaks configured to define selectable wavelengths as well as compensate for asymmetric mode pulling as described above. Etalon 62 is adjusted such that etalon 62, together with wavelength locker 10 and end mirror 50, feed back light along path 60 to gain medium 48 at a selected wavelength corresponding to single selected asymmetric transmission peak or pass band provided by wavelength locker 10. Wavelength locker 10 and etalon 62 are tilted (not shown) with respect to the end mirror 50 to avoid direct reflection of the surfaces of wavelength locker 10 and etalon 62 from returning to gain medium 48. Etalon 62 is configured to suppress all other transmission peaks or bands, either via Vernier effect, or by having a free spectral range that creates only a single transmission peak within the wavelength range of interest as noted above. While the apparatus 46 is thus tuned to a selected wavelength for single mode operation, detector 72 monitors the relationship of the external cavity modes with respect to the selected transmission peak, and tuning device adjusts the external cavity optical path length to maintain or center the selected external cavity mode at the transmission peak of the wavelength locker 10 to lock the wavelength and prevent mode hopping, as described above. Since the selected transmission peak is asymmetric in accordance with the invention, the asymmetric mode pulling effect that arises during single mode laser operation is compensated for or otherwise overcome, and servoing to optimally lock the external cavity to the selected transmission peak can easily be carried out. Output from the apparatus 46 may be collected from (partially transmissive) rear facet 54, from behind end mirror 50, or elsewhere, and coupled into an optical fiber in a conventional manner.

In certain embodiments the etalons 12 and 14 of wavelength locker 10 may be individually or collectively adjustable to provide selection of channel frequency during laser operation, and/or to provide adjustment of the level of transmission peak asymmetry, as noted above. One or more tuning devices (not shown) may thus be used in association with etalon 12 and/or etalon 14, to provide selective tuning thereof during laser operation. DWDM systems and networks are increasingly dynamic and reconfigurable in nature, and continuous laser operation according to a fixed transmission grid is not always optimal or desirable. Active adjustment of the optical path length of etalon 12 allows channel frequencies to be adjusted or changed as desired. This adjustment may be via thermo-optic electro-optic effect, by angle tuning, or via other tuning mechanism as related above. The use of selective thermal control of a wavelength locker is also described U.S. patent application Ser. No. 09/900,474 filed on Jul. 6, 2001 and incorporated herein by reference.

Additionally, the active, independent adjustment of secondary etalon 14 allows selective adjustment of the asymmetry introduced to the transmission peaks of the wavelength locker 10. Single mode laser operation at relatively low output power levels will often require less asymmetry in the transmission peaks to compensate for asymmetric mode pulling, than is required at higher output powers. Selective adjustment of the secondary etalon optical path length (which may be carried out together with adjustment of the primary etalon optical path length) allows adjustment of transmission peak asymmetry according to the degree of asymmetric mode pulling that will occur during laser operation.

In still other embodiments of the invention, another etalon apparatus substantially similar to wavelength locker 10 may replace the tunable etalon 62 of FIG. 4. Thus, two etalon devices (each similar to wavelength locker 10) are present in the external cavity between gain medium 48 and end mirror 50. The two etalon devices (each similar to wavelength locker 10) in this embodiment are each tunable, via thermo-optic or other effect as described above, to provide dual sets of asymmetric transmission peaks or pass bands. In other words, the wavelength locker and wavelength selection element or tunable element in the external cavity are each configured to generate an asymmetric power transfer function. Wavelength selection may be achieved via Vernier effect as described above, or by configuring one of the etalon devices (similar to wavelength locker 10) to have a free spectral range that creates a single, asymmetric transmission peak or pass band that allows selection of one of a plurality of asymmetric transmission peaks or pass bands, as also noted above.

Figure 5:
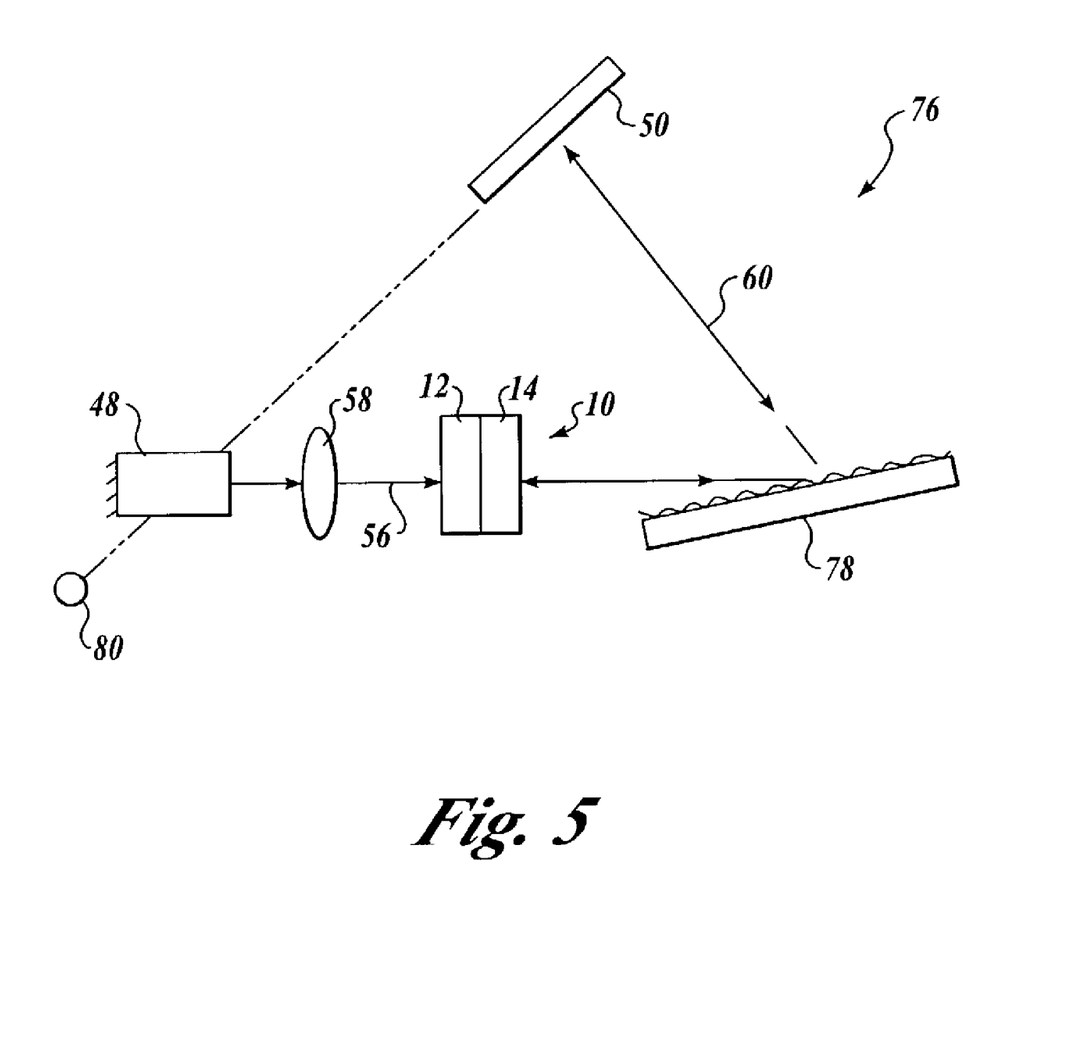
FIG. 5 is a schematic representation of another embodiment of an external cavity laser apparatus in accordance with an embodiment of the invention.

Reference is now made to FIG. 5, wherein is shown another embodiment of an external cavity laser apparatus 76, wherein like reference numbers are used to denote like parts. The apparatus 76 includes a grating 78 as a wavelength selection element. Grating 78 is positioned in optical path 60 after wavelength locker 10 and before end mirror 50. End mirror 50 is positioned to selectively receive and reflect different diffractions from grating 78, which correspond to selectable wavelengths. The diffractive nature of grating 78 results in a "folded" external cavity. Grating 78 may be tunable by rotation, or may be stationary while end mirror 50 is moved with respect to a pivot point 80 via a pivot arm (not shown) in a conventional Littman-Metcalf arrangement, such that end mirror 50 selectively receives different diffractions from grating at different positions and accordingly returns light at a selected wavelengths to grating 78 and, together with wavelength locker 10, to gain medium 48. Output from the apparatus 76 may be collected from the beam reflected off grating 78, which is coupled into an optical fiber (not shown).

The apparatus 76 operates in a manner that is substantially the same as described above for the apparatus 46, with the primary difference being the wavelength selection mechanism, which here involves tuning via the positional relationship of grating 78 and end mirror 50. Wavelength locker 10 may be used with other types of grating tuning wherein the grating itself is moved rather than the end mirror, and/or where the grating is used in transmission rather than reflection as shown in FIG. 5.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. An apparatus comprising:
   first and second etalons joined together at a central reflective surface and having respective outer mutually parallel reflective surfaces defining a third etalon, wherein,
   (a) said first etalon defines a first set of transmission peaks corresponding to selectable wavelengths; and
   (b) said second and third etalons respectively define second and third sets of transmission peaks, said second and third sets of transmission peaks to introduce asymmetry to said first set of transmission peaks,
   and wherein said first, second and third sets of transmission peaks define a set of asymmetric transmission peaks each having first and second slopes and a transmission maximum therebetween, said first slope being steeper than said second slope to define an asymmetric power transfer function.

2. The apparatus of claim 1, wherein said first slope is on a longer wavelength side of said transmission maximum.

3. The apparatus of claim 1, wherein an asymmetry in said set of asymmetric transmission peaks is to compensate for at least one of an asymmetric mode pulling effect of a laser gain medium and asymmetric gain saturation in an external cavity laser.

4. The apparatus of claim 1, wherein said set of asymmetric transmission peaks comprises a plurality of transmission peaks.

5. The apparatus of claim 1, wherein said first and second etalons each respectively have first and second free spectral ranges, said first free spectral range is within approximately two percent of said second free spectral range.

6. The apparatus of claim 5, wherein said third etalon has a third free spectral range, said third free spectral range is smaller than that of said first free spectral range and said second free spectral range.

7. The apparatus of claim 6, wherein said third free spectral range is approximately one half that of said first free spectral range.

8. The apparatus of claim 1, wherein at least one of said etalons is tunable.

9. The apparatus of claim 1, wherein said first, second and third etalons each respectively have first, second and third free spectral ranges, said first free spectral range is within approximately two percent of said second free spectral range, said third free spectral range is smaller than said first and second free spectral ranges.

10. An external cavity laser, comprising:
(a) a gain medium emitting a light beam;
(b) a reflective element positioned in said light beam; and
(c) an etalon element positioned in said light beam between said gain medium and said reflective element, said etalon element to generate an asymmetric power transfer function to compensate or correct for at least one of an asymmetric mode pulling effect on a gain medium of the external cavity laser and asymmetric gain saturation in the external cavity laser.

11. The external cavity laser of claim 10, further comprising a channel selector coupled to the etalon element.

12. The external cavity laser of claim 11, further comprising a wavelength selection element positioned in said light beam between said gain medium and said reflective element.

13. The external cavity laser of claim 12, wherein said wavelength selection element is tunable.

14. The external cavity laser of claim 13, wherein said wavelength selection element is to generate an asymmetric power transfer function.

15. The external cavity laser of claim 13, wherein said wavelength selection element comprises a tunable etalon.

16. The external cavity laser of claim 13, wherein said wavelength selection element comprises a grating.

17. The external cavity laser of claim 11, wherein said etalon element is tunable.

18. The external cavity laser of claim 10, wherein said etalon element comprises at least two pairs of mutually parallel reflective surfaces to define said asymmetric power transfer function.

19. The external cavity laser of claim 18, wherein said etalon apparatus comprises first and second etalons, said two pairs of reflective surfaces associated with said first and second etalons.

20. The external cavity laser of claim 19, wherein said first and second etalons are joined together at a central one of said reflective surfaces.

21. The external cavity laser of claim 20, wherein outermost ones of said reflective surfaces define a third etalon.

22. The external cavity laser of claim 21, wherein
(a) said first etalon defines a first set of transmission peaks corresponding to a grid of selectable wavelengths; and
(b) said second and third etalons respectively define second and third sets of transmission peaks, said second and third sets of transmission peaks to introduce asymmetry to said first set of transmission peaks.

23. The external cavity laser of claim 22, wherein said first, second and third sets of transmission peaks define a set of asymmetric transmission peaks each having first and second slopes and a transmission maximum therebetween, said first slope being steeper than said second slope.

24. The external cavity laser of claim 23, wherein said first slope is on a longer wavelength side of said transmission maximum.

25. The external cavity laser of claim 23, wherein said set of asymmetric transmission peaks is to compensate an asymmetric mode pulling effect of said gain medium.

26. The external cavity laser of claim 21, wherein said first, second and third etalons each respectively have first, second and third free spectral ranges, said first free spectral range is within approximately two percent of that of said second free spectral range, said third free spectral range is smaller than that of said first and second free spectral ranges.

27. The external cavity laser of claim 21, wherein at least one of said etalons is tunable.

28. An external cavity laser, comprising:
(a) a gain medium having first and second facets and emitting a light beam from said first facet;
(b) a reflective element positioned in said light beam, said reflective element and said second facet defining an external laser cavity;
(c) an etalon element positioned in said light beam between said gain medium and said reflective element, said etalon element to generate an asymmetric power transfer function to compensate or correct for at least one of an asymmetric mode pulling effect on the gain medium and asymmetric gain saturation in the external cavity laser; and
(d) a tunable wavelength selection element positioned in said light beam between said gain medium and said reflective element, said etalon element and said tunable wavelength selection element operable to feed back light of a selected wavelength to said gain medium.

29. The external cavity laser of claim 28, wherein said etalon element comprises at least two pairs of mutually parallel reflective surfaces to define said asymmetric power transfer function.

30. The external cavity laser of claim 29, wherein said etalon apparatus comprises first and second etalons, said two pairs of reflective surfaces associated with said first and second etalons.

31. The external cavity laser of claim 30, wherein said first and second etalons are joined together at a central one of said reflective surfaces, and wherein outermost ones of said reflective surfaces define a third etalon.

32. The external cavity laser of claim 31, wherein
(a) said first etalon defines a first set of transmission peaks corresponding to a grid of selectable wavelengths; and
(b) said second and third etalons respectively define second and third sets of transmission peaks, said second and third sets of transmission peaks to introduce asymmetry to said first set of transmission peaks.

33. The external cavity laser of claim 32, wherein said first, second and third sets of transmission peaks define a set of asymmetric transmission peaks each having first and second slopes and a transmission maximum therebetween, said first slope being steeper than said second slope.

34. The external cavity laser of claim 33, wherein said first slope is on a longer wavelength side of said transmission maximum.

35. The external cavity laser of claim 33, wherein said set of asymmetric transmission peaks is to compensate an asymmetric mode pulling effect of said gain medium when operating at said selected wavelength.

36. The external cavity laser of claim 32, wherein said first, second and third etalons each respectively have first, second and third free spectral ranges, said first free spectral range is within approximately two percent of said second free spectral range, said third free spectral range is smaller than said first and second free spectral ranges.

37. A method for generating an asymmetric power transfer function, the method comprising generating first, second, and third sets of transmission peaks by directing a light beam through first and second etalons joined together at a central reflective surface, each of the first and second etalons having a respective outer mutually parallel reflective surface defining a third etalon, said first set of transmission peaks defining a plurality of selectable wavelengths, said second and third sets of transmission peaks introducing an asymmetry to said first set of transmission peaks by defining a set of asymmetric transmission peaks from said first, second and third sets of transmission peaks, each said asymmetric transmission peak having first and second slopes and a transmission maximum therebetween, said first slope being steeper than said second slope.

38. The method of claim 37, wherein said first slope is on a longer wavelength side of said transmission maximum.

39. The method of claim 38, further comprising employing said asymmetric transmission peaks to compensate for at least one of an asymmetric mode pulling effect of a laser gain medium and asymmetric gain saturation in an external cavity laser.

40. The method of claim 37, wherein said first and second etalons each respectively have first and second free spectral ranges, said first free spectral range is within approximately two percent of said second free spectral range.

41. The method of claim 40, wherein said third etalon has a third free spectral range, said third free spectral range is smaller than that of said first free spectral range and said second free spectral range.

42. The method of claim 41, wherein said third free spectral range is approximately one half of said first free spectral range.

43. The method of claim 37, wherein first and second ones of said reflective surfaces have approximately equal reflectivity, and a third one of said reflective surfaces has a lower reflectivity than said first and second reflective surfaces.

44. A method of operation of an external cavity laser, comprising:
(a) emitting a light beam by a gain medium;
(b) positioning a reflective element in said light beam;
(c) generating an asymmetric power transfer function in association with said light beam by positioning at least one etalon element in said light beam, the asymmetric power transfer function compensating for at least one of an asymmetric mode pulling effect in said gain medium and asymmetric gain saturation in the external cavity laser.

45. The method of claim 44, wherein said generating said asymmetric power transfer function comprises generating a plurality of asymmetric transmission peaks, each said asymmetric transmission peak corresponding to a selectable wavelength.

46. The method of claim 45, further comprising:
(a) selecting a wavelength corresponding to one of said asymmetric transmission peaks; and
(b) feeding back light to said gain medium at said selected wavelength.

47. The method of claim 44, further comprising positioning a wavelength selection element in said light beam between said gain medium and said reflective element, and wherein said selecting is carried out by tuning said wavelength selection element.

48. The method of claim 47, wherein said wavelength selection element comprises an etalon.

49. The method of claim 47, wherein said wavelength selection element comprises a grating.

50. The method of claim 44, wherein said etalon element comprises at least two etalons that together define at least two pairs of mutually parallel reflective surfaces.

51. The method of claim 50, further comprising:
(a) joining said first and second etalons together at a central one of said reflective surfaces; and
(b) defining a third etalon by outermost ones of said reflective surfaces, said first, second and third etalons respectively to generate first, second and third sets of transmission peaks.

52. The method of claim 51, further comprising generating a plurality of asymmetric transmission peaks from said first, second and third sets of transmission peaks, each said asymmetric transmission peak corresponding to a selectable wavelength, each said asymmetric transmission peak having first and second slopes and a transmission maximum therebetween, said first slope being steeper than said second slope.

53. The method of claim 52, wherein said first slope is on a longer wavelength side of said transmission maximum.

* * * * *